(12) United States Patent
Goyal et al.

(10) Patent No.: US 12,260,630 B2
(45) Date of Patent: Mar. 25, 2025

(54) METHODS AND APPARATUS TO IMPLEMENT PARALLEL ARCHITECTURES FOR NEURAL NETWORK CLASSIFIERS

(71) Applicant: Intel Corporation, Santa Clara, CA (US)

(72) Inventors: Ankit Goyal, Santa Clara, CA (US); Alexey Bochkovskiy, Podolsk (RU); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 928 days.

(21) Appl. No.: 17/359,232

(22) Filed: Jun. 25, 2021

(65) Prior Publication Data

US 2021/0319319 A1    Oct. 14, 2021

Related U.S. Application Data

(60) Provisional application No. 63/194,627, filed on May 28, 2021.

(51) Int. Cl.
*G06K 9/00* (2022.01)
*G06F 18/25* (2023.01)
(Continued)

(52) U.S. Cl.
CPC ............. *G06V 10/82* (2022.01); *G06F 18/25* (2023.01); *G06F 18/253* (2023.01); *G06N 3/045* (2023.01);
(Continued)

(58) Field of Classification Search
CPC .... G06V 10/82; G06V 10/806; G06V 10/764; G06F 18/253; G06F 18/25; G06N 3/045; G06N 3/063; G06N 3/08
See application file for complete search history.

(56) References Cited

U.S. PATENT DOCUMENTS 5,359,700 A * 10/1994 Seligson ................ G06N 3/063
706/41
7,280,696 B2 * 10/2007 Zakrzewski .......... G06F 18/253
382/218
(Continued)

OTHER PUBLICATIONS

Chen, Qiaosong, et al. "A multi-scale fusion convolutional neural network for face detection." 2017 IEEE International Conference on Systems, Man, and Cybernetics (SMC). IEEE, 2017. (Year: 2017).*
(Continued)

*Primary Examiner* — Avinash Yentrapati
(74) *Attorney, Agent, or Firm* — HANLEY, FLIGHT & ZIMMERMAN, LLC

(57) ABSTRACT

Methods, apparatus, systems, and articles of manufacture are disclosed to implement parallel architectures for neural network classifiers. An example non-transitory computer readable medium comprises instructions that, when executed, cause a machine to at least: process a first stream using first neural network blocks, the first stream based on an input image; process a second stream using second neural network blocks, the second stream based on the input image; fuse a result of the first neural network blocks and the second neural network blocks; perform average pooling on the fused result; process a fully connected layer based on the result of the average pooling; and classify the image based on the output of the fully connected layer.

24 Claims, 10 Drawing Sheets

(51) Int. Cl.
  *G06N 3/045* (2023.01)
  *G06N 3/063* (2023.01)
  *G06N 3/08* (2023.01)
  *G06V 10/764* (2022.01)
  *G06V 10/80* (2022.01)
  *G06V 10/82* (2022.01)

(52) U.S. Cl.
  CPC ............... *G06N 3/063* (2013.01); *G06N 3/08* (2013.01); *G06V 10/764* (2022.01); *G06V 10/806* (2022.01)

(56) References Cited

U.S. PATENT DOCUMENTS

| | | | | |
|---|---|---|---|---|
| 2005/0069207 | A1* | 3/2005 | Zakrzewski | G06V 20/52 382/218 |
| 2020/0342595 | A1* | 10/2020 | Jia | G06T 7/0012 |
| 2023/0393304 | A1* | 12/2023 | Liu | G06N 3/096 |
| 2023/0401429 | A1* | 12/2023 | Sun | G06N 3/0464 |

OTHER PUBLICATIONS

Wang, Ruxin, Jianping Fan, and Ye Li. "Deep multi-scale fusion neural network for multi-class arrhythmia detection." IEEE journal of biomedical and health informatics 24.9 (2020): 2461-2472. (Year: 2020).*
Sun, Genyun, et al. "Fusion of multiscale convolutional neural networks for building extraction in very high-resolution images." Remote Sensing 11.3 (2019): 227. (Year: 2019).*
Wang, Wentao, et al. "Parallel multi-resolution fusion network for image inpainting." Proceedings of the IEEE/CVF international conference on computer vision. 2021. (Year: 2021).*
Perez, "Optimal Bidirectional Rapidly-Exploring Random Trees," Computationally Efficient Bidirectional RRT, accessed from http://people.csail.mit.edu/aperez/obirrt/ on May 18, 2022, 5 pages.
Arunkumar et al., "MCM-GPU: Multi-Chip-Module GPUs for Continued Performance Scalability," ISCA, 2017, 13 pages.
Chen et al., "DeepLab: Semantic Image Segmentation with Deep Convolutional Nets, Atrous Convolution, and Fully Connected CRFs," TPAMI, 2017, 14 pages.
Chen et al., "Attention to Scale: Scale-aware Semantic Image Segmentation," CVPR, 2016, 10 pages.
Cubuk et al, "RandAugment: Practical automated data augmentation with a reduced search space," CVPRW, 2020, 13 pages.
Cybenko, "Approximation by Superpositions of a Sigmoidal Function," Math. Control Signals Systems (1989) 2: pp. 303-314, 1989, 12 pages.
Deng et al., "ImageNet: A Large-Scale Hierarchical Image Database," CVPR, 2009, 8 pages.
Ding et al., "RepVGG: Making VGG-style ConvNets Great Again," arXiv:2101.03697, 2021, 10 pages.
Dosovitskiy et al, "An Image is Worth 16×16 Words: Transformers for Image Recognition at Scale," ICLR, 2021, 22 pages.
Eigen et al., "Understanding Deep Architectures using a Recursive Convolutional Network," arXiv;1312.1847, 2013, 9 pages.
He et al., "Delving Deep into Rectifiers: Surpassing Human-Level Performance on Imagenet Classification," ICCV, 2015, 11 pages.
HE et al., "Deep Residual Learning for Image Recognition," CVPR, 2016, 12 pages.
He et al., "Identity Mappings in Deep Residual Networks," ECCV, 2016, 15 pages.
Hu et al, "Squeeze-and-excitation-networks," CVPR, 2018, 13 pages.
Huang et al, "Densely Connected Convolutional Networks," CVPR, 2017, 9 pages.
Huang et al., "Deep Networks with Stochastic Depth," ECCV, 2016, 16 pages.
Jacot et al., "Neural Tangent Kernel: Convergence and Generalization in Neural Networks," NeurIPS, 2018, 19 pages.
Kannan, "Enabling Interposer-Based Disintegration of Multi-core processors," MICRO, 2015, 55 pages.
Larsson et al., "Fractalnet: Ultra-deep Neural Networks without Residuals," ICLR 2017, 11 pages.
Li et al, "Enhanced Convolutional Neural Tangent Kernels," arXiv:1911.00809, 2019, 18 pages.
Liang et al., "Why Deep Neural Networks for Function Approximation?," ICLR, 2017, 17 pages.
Lin et al., "Feature Pyramid Networks for Object Detection," CVPR, 2017, 10 pages.
Paszke et al., "Pytorch: An Imperative Style, High-Performance Deep Learning Library," NeurIPS, 2019, 12 pages.
Ramachandran et al., "Searching for Activation Functions," arXiv:1710.05941, 2017, 13 pages.
Russakovsky et al., "Imagenet Large Scale Visual Recognition Challenge," IJCV, 2015, 43 pages.
Sandler et al., "Mobilenetv2: Inverted Residuals and Linear Bottlenecks," CVPR, 2018, 14 pages.
Simonyan et al., "Very Deep Convolutional Networks for Large0Scale Image Recognition," ICLR, 2015, 14 pages.
Szegedy et al. "Rethinking the Inception Architecture for Computer Vision," ICPR, 2016, 10 pages.
Tan et al., "MnasNet: Platform-aware Neural Architecture Search for Mobile," CVPR, 2019, 9 pages.
Tan et al., "EfficientNet: Rethinking Model Scaling for Convolutional Neural Networks," ICML, 2019, 11 pages.
Urban et al., "Do Deep Convolutional Nets Really Need to be Deep and Convolutional?," ICLR, 2017, 13 pages.
Wang et al., "Deep High-Resolution Representation Learning for Visual Recognition," TPAMI, 2020, 23 pages.
Wu et al., "Fusing Multi-Stream Deep Networks for Video Classification," ACM Multimedia, 2016, 9 pages.
Zagoruyko et al., "Wide Residual Networks," BMVC, 2016, 15 pages.

* cited by examiner

METHODS AND APPARATUS TO IMPLEMENT PARALLEL ARCHITECTURES FOR NEURAL NETWORK CLASSIFIERS

RELATED APPLICATION

This patent claims priority to and the benefit of U.S. Provisional Patent Application Ser. No. 63/194,627, filed May 28, 2021. U.S. Provisional Patent Application No. 63/194,627 is hereby incorporated herein by reference in its entirety.

FIELD OF THE DISCLOSURE

This disclosure relates generally to machine learning classifiers and, more particularly, to methods and apparatus to implement parallel architectures for neural network classifiers.

BACKGROUND

The fields of machine learning and artificial intelligence continue to expand at a rapid pace both in terms of improvements as well as scope of usage. One type of machine learning, Deep Neural Networks (DNNs), have revolutionized the field of artificial intelligence by their ability to accurately process and/or classify complex data. As their name suggests, a key characteristic of DNNs is that they are deep (i.e., they have a long path from input to an output neuron).

Figure 1:
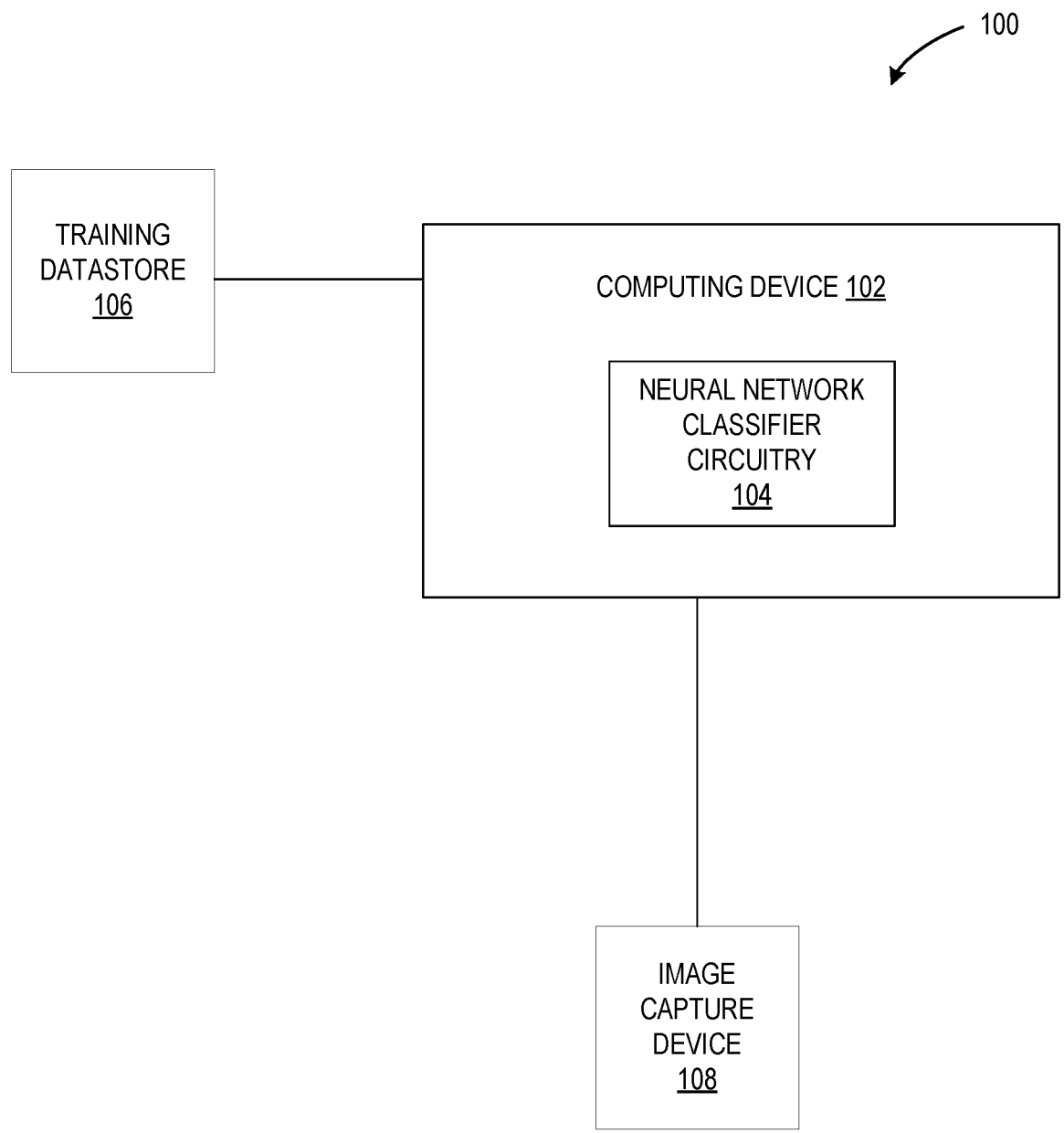
FIG. 1 is a block diagram of an example environment in which a computing device operates a neural network classifier instructions to implement a neural network in accordance with the methods and apparatus disclosed herein.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), Neural Processing Unit (NPU), Tensor Processing Unit (TPU), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more NPUs, one or more TPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

While DNNs provide many advantages, a deeper network leads to more sequential processing and higher latency.

Accordingly, it is difficult to parallelize such networks. For at least this reason, such networks are not well-suited for applications that require fast responses. Scaling width could be an effective way to increase a network's performance while limiting depth. Wide ResNets showed that shallower networks with a large width can achieve similar performance to deeper ResNets. However, trivially scaling width does not lead to the best performing models at low depth. Neural network models before ResNets, like AlexNet and Visual Geometry Group (VGG), utilize a relatively reduced depth due to difficulty training very deep models without residual connections. The HRNet architecture maintains multi-resolution streams throughout the forward pass; these streams are fused together at regular intervals to exchange information.

The methods and apparatus disclosed herein implement a new way of designing neural networks that are non-deep but still perform very well. The proposed non-deep networks (referred to as ParNet) can be utilized for extremely fast pattern recognition systems. According to methods and apparatus disclosed herein, parallel subnetworks may be utilized instead of all layers stacked one layer after another, which helps to reduce depth while maintaining high performance. These parallel sub-structures (called streams) could be executed on independent processing units, which further reduces latency.

In some example implementations, such networks utilize parallel sub-structures to operate at much lower depth as compared to prior networks (e.g., a depth of 12 versus a prior depth of 50 for Wide ResNet or prior depth of at least 38 for the smallest HRNet classifiers). Furthermore, some examples utilize multiple streams that may be operated in parallel and such streams may be fused once at the very end of the analysis to facilitate easier parallelization (e.g., implementation on a multi-processor system such as a computing device including multiple graphic processing units (GPUs)). Some implementations in accordance with the methods and apparatus disclosed herein outperform early low-depth networks like AlexNet and VGG. Despite the low depth, some implementations achieve perform comparable to deep neural networks.

FIG. 1 is a block diagram of an example environment 100 in which a computing device 102 operates a neural network classifier circuitry 104 to implement a neural network in accordance with the methods and apparatus disclosed herein. The example environment 100 includes the example computing device 102, an example training datastore 106, and an example image capture device 108.

The example computing device 102 is a processor-based computing device capable of operating the neural network classifier circuitry 104. For example, the computing device 102 may be a server, a personal computer, a mobile computing device, a smartphone, an embedded computing device, etc. While the example computing device 102 is shown as a single computing device, the computing device 102 may, alternatively, be implemented by a distributed computing system. For example, when the neural network classifier circuitry 104 include three parallel sub-structures, the computing device 102 may be implemented by three separate computing device (e.g., three separate computing device that includes three separate mainboards, processors, etc.). As described herein, even when the computing device 102 is a single computing device, the computing device 102 may include multiple components (e.g., multiple processors, multiple cores on one or more processors, multiple GPUs or other special purpose processors, XPUs, etc.).

The example neural network classifier circuitry 104 is implemented by one or more processors executing computer executable instructions to instantiate a neural network in accordance with the methods and apparatus disclosed herein (e.g., in accordance with FIGS. 2-7). Alternatively, the neural network classifier circuitry 104 could be implemented in any other form such as, for example, an FPGA structured to implement the operations of the neural network classifier instructions.

The example training datastore 106 is a database of labeled data that may be utilized for training a neural network instantiated by operation of the neural network classifier circuitry 104. For example, the training datastore 106 may be a database of images that are labeled with a classification (e.g., a database of images of animals where the label identifies the animal in the image). The training datastore 106 may be any other type of data storage or data structure that is in or external to the computing device 102. Furthermore, while a single training datastore 106 is illustrated, the computing device 102 may access training data from any number of datastores.

The example image capture device 108 is a computing device that captures an image and submits the image to the computing device 102 for classification by a neural network instantiated by operation of the neural network classifier circuitry 104. For example, the image capture device could be a mobile phone that includes a camera, which requests classification of images captured by the camera. Any source of images for classification may be utilized (e.g., image files, images from a scanner, images output by a display, etc.). While the example image capture device 108 is separate from the computing device 102 in the illustrated example, in other implementations the image capture device 108 may be integrated into the computing device. Furthermore, while the example image capture device 108 is connected directly to the computing device 102, the image capture device 108 may be connected via one or more intermediate devices (e.g., the computing device 102 and the image capture device 108 may be communicatively coupled via a network such as the Internet).

In operation of the example environment 100 of FIG. 1, parameters (e.g., dimension, striding, zero-padding, weights, neuron connections, etc.) of the neural network instantiated by execution of the neural network classifier instructions may be trained using data from the training datastore 106. Subsequently, the trained neural network may be utilized to classify images captures by the image capture device 108.

Figure 2:
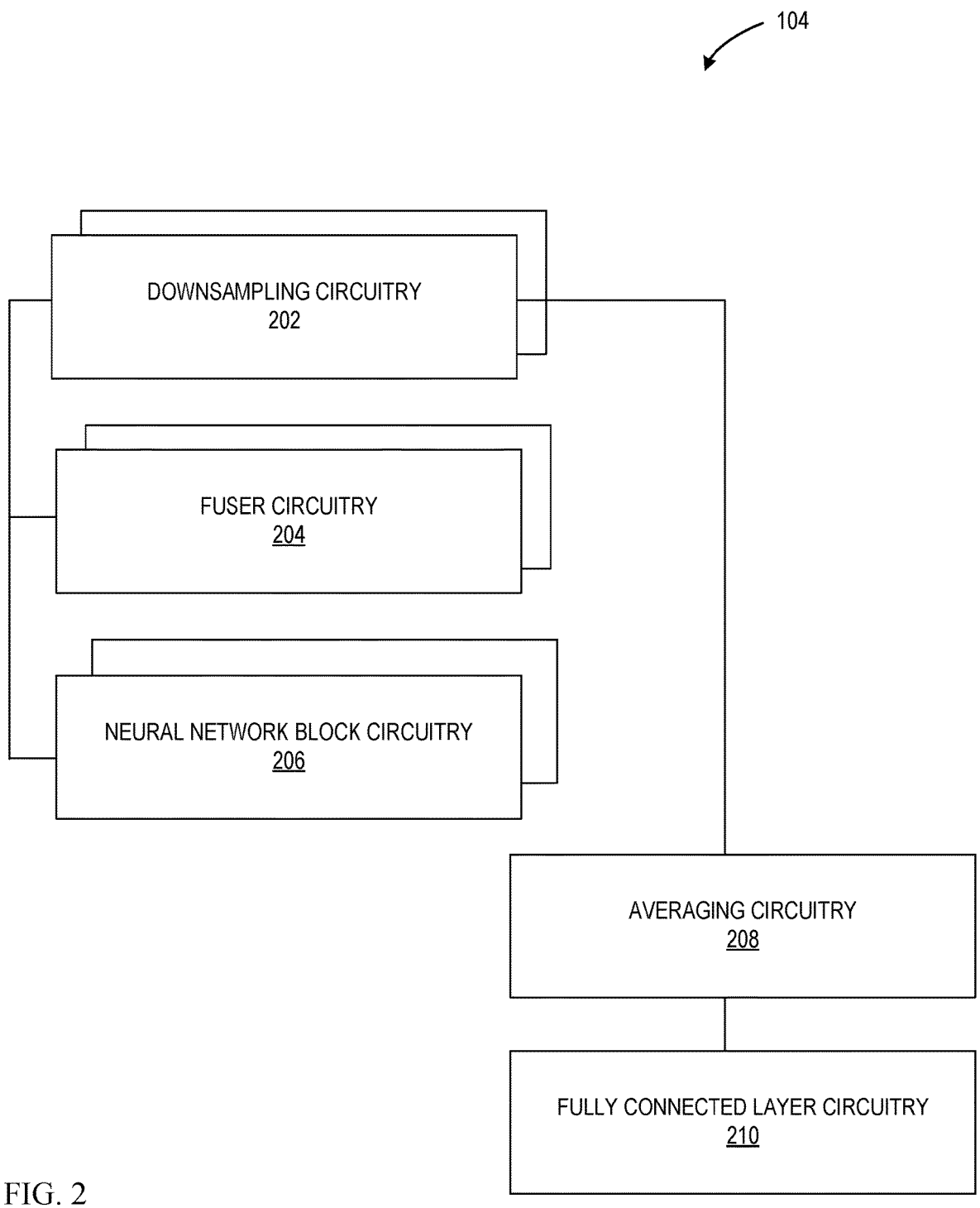
FIG. 2 is a block diagram of an example implementation of the neural network classifier circuitry.

FIG. 2 is a block diagram of an example implementation of the neural network classifier circuitry 104. The example network classifier circuitry 104 of FIG. 2 includes a plurality of downsampling circuitry 202, a plurality of fuser circuitry 204, a plurality of neural network block circuitry 206, an example averaging circuitry 208, and an example fully connected layer circuitry 210.

The example downsampling circuitry 202 reduces resolution and increases width of input data (e.g., images). For example, the downsampling circuitry may facilitate multi-scale processing. The example downsampling circuitry 202 In the downsampling circuitry 202, there is no skip connection, instead, the example downsampling circuitry 202 includes a single-layered squeeze excitation (SE) module parallel to a convolution layer.

The example fuser circuitry 204 combines information from multiple resolutions to merge streams of parallel sub-structures of a neural network. The example fuser circuitry 204 is similar to the downsampling circuitry 202 but contains an extra concatenation layer. Because of concatenation, an input to the fuser circuitry 204 has twice as many channels as the downsampling circuitry 202. To reduce the parameter count, the fuser circuitry 204 may utilize use convolution with group 2.

Figure 3:
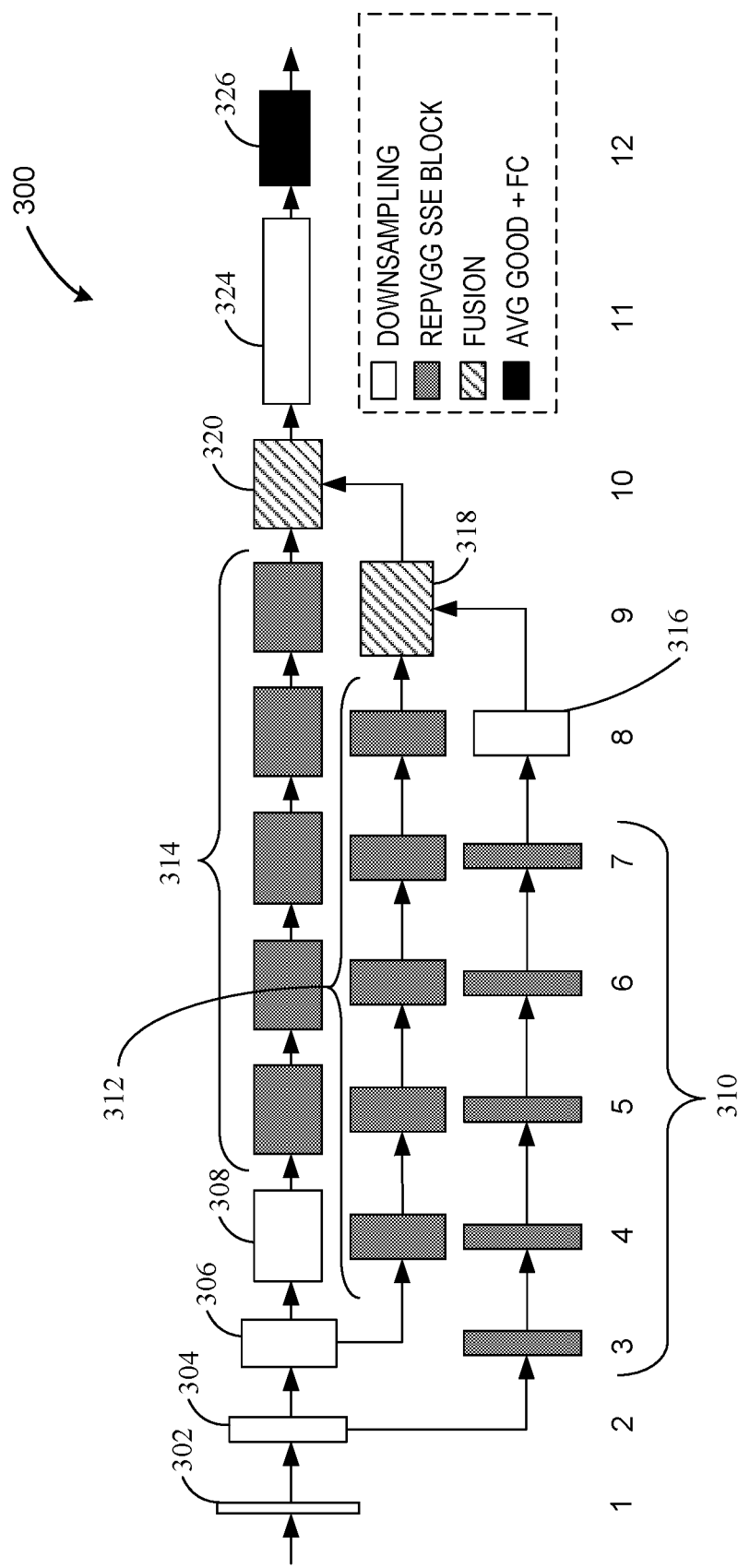
FIG. 3 is a block diagram of an example neural network architecture implemented by the neural network classifier circuitry of FIGS. 1 and/or 2.

The example neural network block circuitry 206 implements the plurality of blocks of the neural network circuitry as described in further detail in conjunction with FIG. 3.

The example blocks implemented by the example neural network block circuitry 206 are based on Rep-VGG, but are modified to include a Skip-Squeeze-Excitation (SSE) layer which is based on the Squeeze-and-Excitation (SE) design. Typical Squeeze-and-Excitation increase depth and, thus, the example blocks utilize a Skip-Squeeze-Excitation design which is applied alongside a skip connection of the block and uses a single fully-connected layer. According to the illustrated example, this design increases performance. An example schematic representation of the block is described in conjunction with FIGS. 4, 5, and 6.

The example average circuitry 208 analyzes a fused result from the multiple streams of the neural network parallel sub-structure and performs average pooling to summarize the presence of a feature in the analyzed data. While average pooling is utilized, any other type of pooling (e.g., maximum pooling may be alternatively utilized).

The example fully connected layer circuitry 210 operates on a flattened result from the averaging circuitry 208 where each input is connected to all neurons. The example fully connected layer circuitry 210 optimizes class scores.

FIG. 3 is a block diagram of an example neural network architecture 300 implemented by the neural network classifier circuitry 104 of FIGS. 1 and/or 2. For illustration of the example, the width of blocks is proportional to the number of output channels and the height of blocks reflects the output resolution.

According to the illustrated example, input data (e.g., an input image) is first downsampled by a first downsampling block 302. The output of the first downsampling block 302 is further downsampled by a second downsampling block 304. The output of the second downsampling block 304 is downsampled by a third downsampling block 306 and is also provided as a first stream to first neural network blocks 310. The output of the third downsampling block 306 is downsampled by a fourth downsampling block 308 and is also provided as a second stream to second neural network blocks 312. The output of the fourth downsampling block is provided as a third stream to third neural network blocks 314. According to the illustrated example, each of the sets of blocks 310, 312, 314 includes 5 RepVGG-SSE blocks that process the features of the inputs at different resolutions.

The output of the first neural network blocks 310 is downsampled by a fifth downsampling block 316. The output of the fifth downsampling block 316 is fused with the output of the second neural network blocks 312 by a first fuser 318 (e.g., using concatenation). The output of the first fuser 318 is fused (e.g., using concatenation) with the output the third neural network blocks 314 by a second fuser 320.

The output of the second fuser 320 is downsampled by a sixth downsampling block 324. The output of the sixth downsampling block 324 is averaged and fully connected by an average pool and fully connected block 326.

While the example neural network architecture 300 illustrates a layout of blocks and connections, other architectures may be utilized to provide a parallel sub-structure-based non-deep neural network. For example, in a system in which images are of lower resolution, the first downsampling block 302 and the second downsampling block 304 may be replaced with RepVGG-SSE blocks. To reduce the number of parameters in the last layer, we replace the sixth downsampling block 324, which has a large width, may be replaced with a narrower 1×1 convolution layer. Also, the number of parameters may be reduced by removing one block from each stream and adding a block at depth 3 with a lower width.

Figure 4:
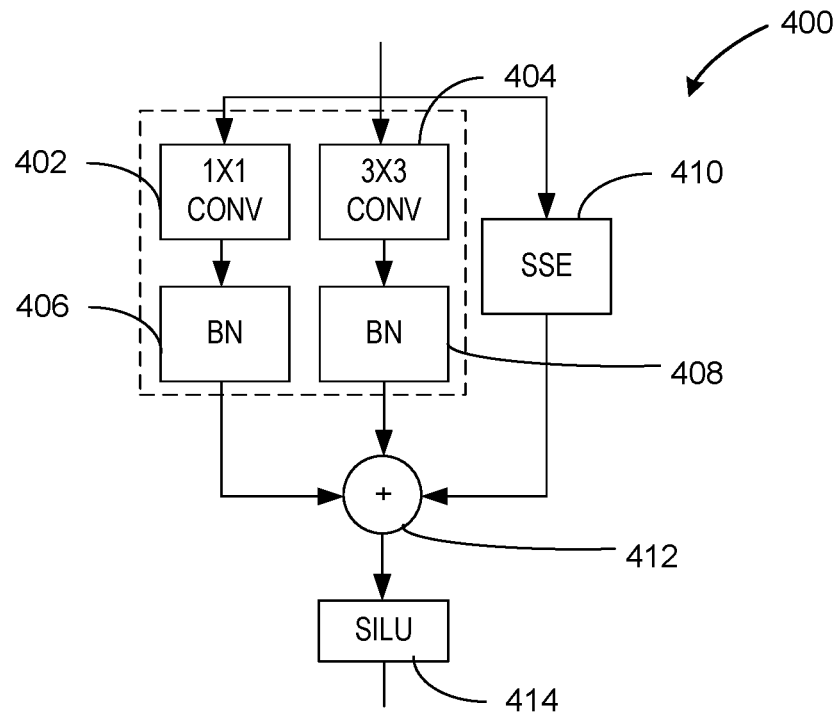
FIG. 4 is a block diagram of an example neural network block that may be utilized to implement the neural network blocks during training.

FIG. 4 is a block diagram of an example neural network block 400 that may be utilized to implement the neural network blocks 310, 312, and/or 314 during training. According to the illustrate example, a skip connection of the block 400 includes a 1×1 convolution 402 in parallel with a 3×3 convolution 404, where the respective outputs are provided to a first batch normalization (BN) block 406 and a second BN block 408, respectively. In parallel with the skip connection, the block 400 includes a Skip-Squeeze Excitation (SSE) 410. For example, the SSE 410 increases receptive field while not affecting depth. The results of the first BN block 406, the second BN block 408 and the SSE block 410 are combined at block 412 and the result is provided to a sigmoid linear unit (SiLU) 414. By utilizing the SiLU 414 instead of a rectified linear unit (ReLU) to increase representational power.

Figure 5:
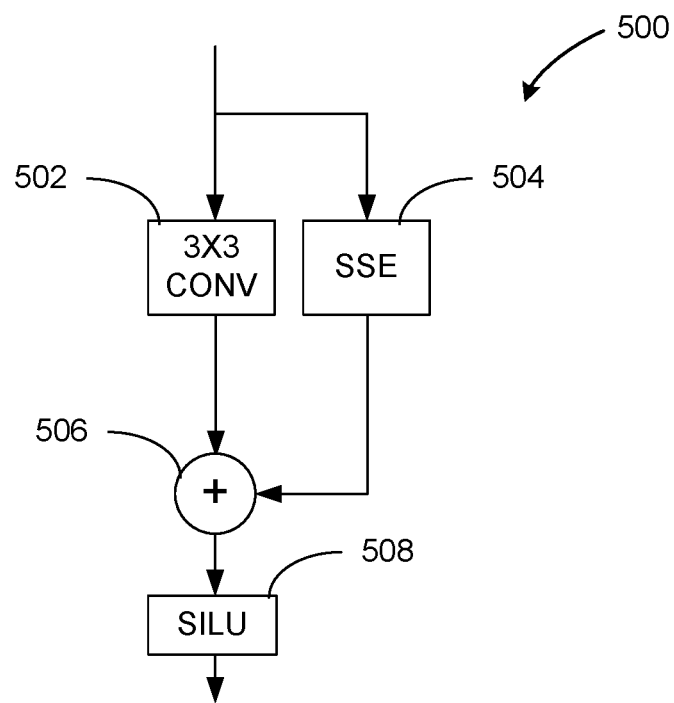
FIG. 5 is a block diagram of an example neural network block that may be utilized after training.

FIG. 5 is a block diagram of an example neural network block 500 that may be utilized after training. Notably, the skip connection of block 400 is fused to a single 3×3 convolution 502. The example neural network block 500 still includes an SSE 502 and the result of the 3×3 convolution 502 is combined with the result of the SSE 504 at block 506 whereupon the result is provided to a SiLU 508. By fusing the 1×1 convolution 402 and the 3×3 convolution 404 into a single 3×3 convolution 502 after training, faster inference can be obtained.

Figure 6:
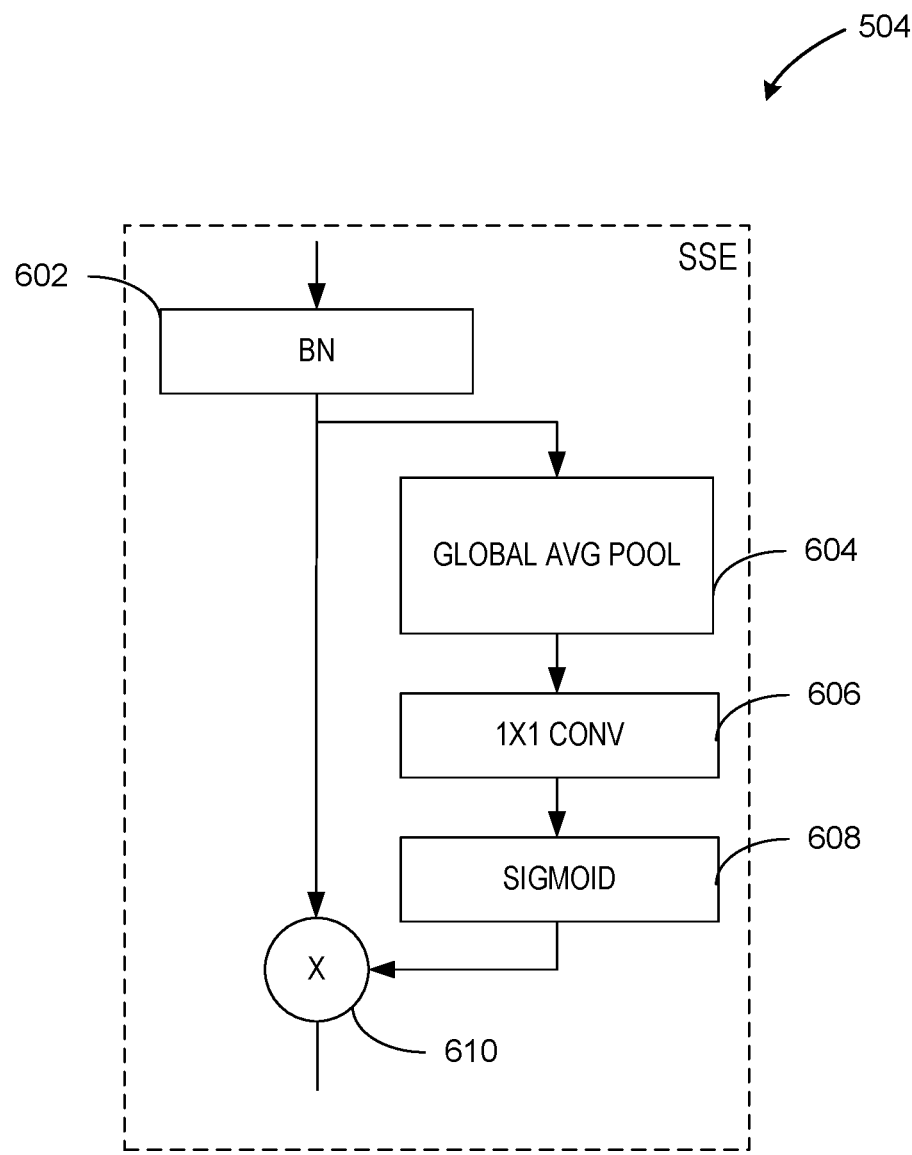
FIG. 6 is a block diagram of an example implementation of the SSE of FIG. 5.

FIG. 6 is a block diagram of an example implementation of the SSE 504 of FIG. 5. The example SSE 504 of FIG. 6 includes a BN 602. The output of the BN 602 is averaged by a global averaging pool 604 and then a 1×1 convolution 606 is applied followed by a sigmoid 608. The output of the BN 602 and the sigmoid 608 are multiplied to generate a result for the SSE 504.

In some examples, the neural network classifier circuitry 104 includes means for downsampling. For example, the means for downsampling may be implemented by downsampling circuitry 202. In some examples, the downsampling circuitry 202 may be implemented by machine executable instructions such as that implemented by at least blocks 702, 704, 708, 710, and block 720 of FIG. 7 executed by processor circuitry, which may be implemented by the example processor circuitry 825 of FIG. 8, the example processor circuitry 900 of FIG. 9, and/or the example Field Programmable Gate Array (FPGA) circuitry 1000 of FIG. 10. In other examples, the downsampling circuitry 202 is implemented by other hardware logic circuitry, hardware implemented state machines, and/or any other combination of hardware, software, and/or firmware. For example, the downsampling circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the neural network classifier circuitry 104 includes means for fusing. For example, the means for fusing may be implemented by fusing circuitry 204. In some examples, the fusing circuitry 204 may be implemented by machine executable instructions such as that implemented by at least blocks 716 and 718 of FIG. 7 executed by processor circuitry, which may be implemented by the example processor circuitry 825 of FIG. 8, the example processor circuitry 900 of FIG. 9, and/or the example Field Programmable Gate Array (FPGA) circuitry 1000 of FIG. 10. In other examples, the fusing circuitry 204 is implemented by other hardware logic circuitry, hardware implemented state machines, and/or any other combination of hardware, software, and/or firmware. For example, the fusing circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the neural network classifier circuitry 104 includes means for processing neural network layer(s). For example, the means for processing neural network layer(s) may be implemented by the neural network block circuitry 206. In some examples, the neural network block circuitry 206 may be implemented by machine executable instructions such as that implemented by at least blocks 706, 712, and 714 of FIG. 7 executed by processor circuitry, which may be implemented by the example processor circuitry 825 of FIG. 8, the example processor circuitry 900 of FIG. 9, and/or the example Field Programmable Gate Array (FPGA) circuitry 1000 of FIG. 10. In other examples, the neural network block circuitry 206 is implemented by other hardware logic circuitry, hardware implemented state machines, and/or any other combination of hardware, software, and/or firmware. For example, the neural network block circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the neural network classifier circuitry 104 includes means for averaging. For example, the means for averaging may be implemented by the averaging circuitry 208. In some examples, the averaging circuitry 208 may be implemented by machine executable instructions such as that implemented by at least block 722 of FIG. 7 executed by processor circuitry, which may be implemented by the example processor circuitry 825 of FIG. 8, the example processor circuitry 900 of FIG. 9, and/or the example Field Programmable Gate Array (FPGA) circuitry 1000 of FIG. 10. In other examples, the averaging circuitry 208 is implemented by other hardware logic circuitry, hardware implemented state machines, and/or any other combination of hardware, software, and/or firmware. For example, the averaging circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the neural network classifier circuitry 104 includes means for implementing a fully connected layer. For example, the means for implementing a fully connected layer may be implemented by the fully connected layer circuitry 210. In some examples, the fully connected layer circuitry 210 may be implemented by machine executable instructions such as that implemented by at least block 724 of FIG. 7 executed by processor circuitry, which may be implemented by the example processor circuitry 825 of FIG. 8, the example processor circuitry 900 of FIG. 9, and/or the example Field Programmable Gate Array (FPGA) circuitry 1000 of FIG. 10. In other examples, the fully connected layer circuitry 210 is implemented by other hardware logic circuitry, hardware implemented state machines, and/or any other combination of hardware, software, and/or firmware. For example, the fully connected layer circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the neural network classifier circuitry of FIG. 1 is illustrated in FIG. 2, one or more of the elements, processes, and/or devices illustrated in FIG. 2 may be combined, divided, re-arranged, omitted, eliminated, and/or implemented in any other way. Further, the example downsampler circuitry 202, the example fuser circuitry 204, the example neural network block circuitry 206, the example averaging circuitry 208, the example fully connected layer circuitry 210 and/or, more generally, the example neural network classifier circuitry 104 of FIG. 1, may be implemented by hardware, software, firmware, and/or any combination of hardware, software, and/or firmware. Thus, for example, any of the example downsampler circuitry 202, the example fuser circuitry 204, the example neural network block circuitry 206, the example averaging circuitry 208, the example fully connected layer circuitry 210 and/or, more generally, the example neural network classifier circuitry 104 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example downsampler circuitry 202, the example fuser circuitry 204, the example neural network block circuitry 206, the example averaging circuitry 208, and/or the example fully connected layer circuitry 210 is/are hereby expressly defined to include a non-transitory computer readable storage device or storage disk such as a memory, a digital versatile disk (DVD), a compact disk (CD), a Blu-ray disk, etc., including the software and/or firmware. Further still, the example neural network classifier circuitry of FIG. 1 may include one or more elements, processes, and/or devices in addition to, or instead of, those illustrated in FIG. 2, and/or may include more than one of any or all of the illustrated elements, processes and devices.

Figure 7:
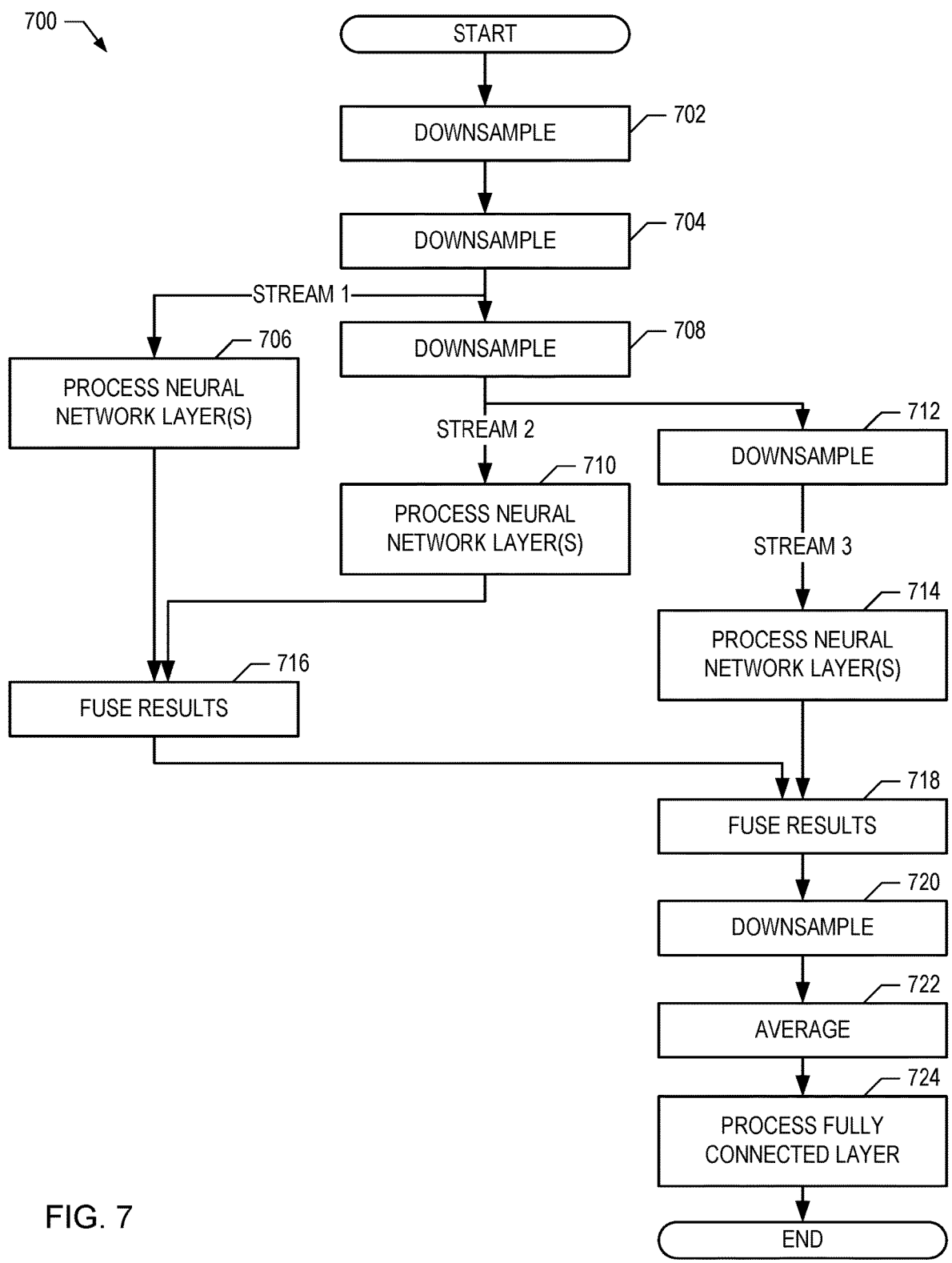
FIG. 7 is a flowchart representative of example machine readable instructions that may be executed by example processor circuitry to implement the neural network classifier circuitry of FIG. 1.

A flowchart representative of example hardware logic circuitry, machine readable instructions, hardware implemented state machines, and/or any combination thereof for implementing the neural network classifier circuitry 104 of FIG. 1 is shown in FIG. 7. The machine readable instructions may be one or more executable programs or portion(s) of an executable program for execution by processor circuitry, such as the processor circuitry 825 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example neural network classifier circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to implement a non-deep neural network with parallel substructures that may support implementation on parallel processing systems (e.g., systems with multiple GPUs for processing, multi-core GPUs, etc.). The machine readable instructions and/or operations 700 of FIG. 7 begin at block 702, at which the downsampler circuitry 202 downsamples input data (e.g., an image received from the image capture device 108). Then, the downsampler circuitry 202 performs a further downsampling (block 704).

The output of the downsampling of block 704 starts a first stream that is processed by the neural network block circuitry 206 (block 706). The output of the downsampling of block 704 is also downsampled by the downsampler circuitry 202 to generate a second stream (block 708). The second stream is processed by the neural network block circuitry 206 (block 710).

The output of the downsampling of block 708 is also downsampled by the downsampler circuitry 202 (block 712). The output of the downsampling of block 712 starts a third stream and is processed by the neural network block circuitry 206 (block 714).

The fuser circuitry 204 fuses the results of the processing of block 706 and the processing of block 712 (block 716). The fuser circuitry 204 further fuses the result of block 716 and the processing of block 714 (block 718).

The example downsampler circuitry 202 downsamples the results of block 718 (block 720). Then, the averaging circuitry 208 performs average pooling (block 722). Finally, the fully connected layer circuitry processes a fully connected layer from the results of the averaging pooling (block 724).

Figure 8:
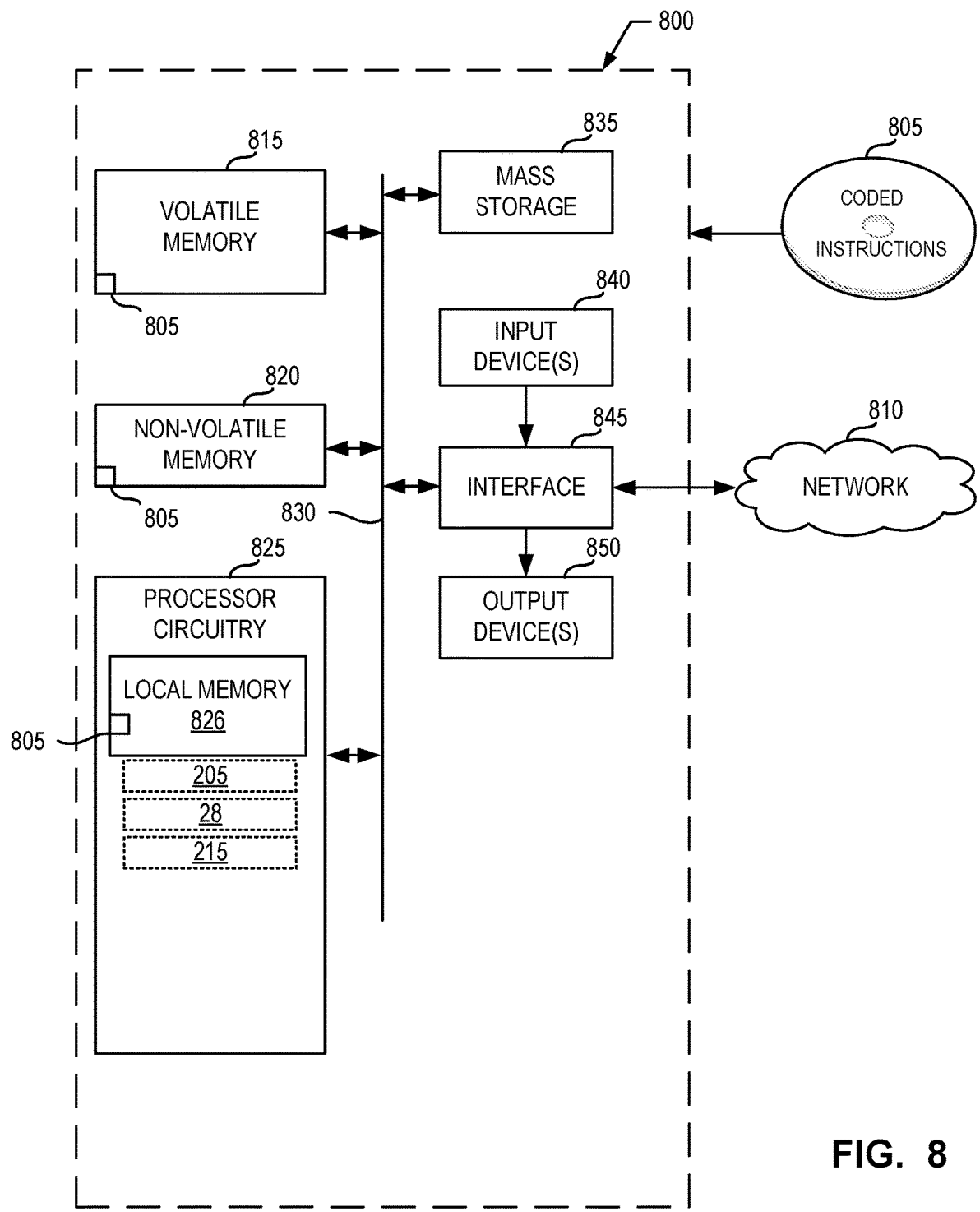
FIG. 8 is a block diagram of an example processing platform including processor circuitry structured to execute the example machine readable instructions of FIG. 7 to implement the neural network classifier circuitry of FIG. 1.

FIG. 8 is a block diagram of an example processor platform 800 structured to execute and/or instantiate the machine readable instructions and/or operations of FIG. 7 to implement the neural network classifier circuitry 104 of FIG. 1 and/or FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the downsampler circuitry 202, the example fuser circuitry 204, the example neural network block circuitry 206, the example averaging circuitry 208, and the fully connected layer circuitry 210.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 7, may be stored in the mass storage device 828, in the volatile memory 814, in the non-volatile memory 816, and/or on a removable non-transitory computer readable storage medium such as a CD or DVD.

Figure 9:
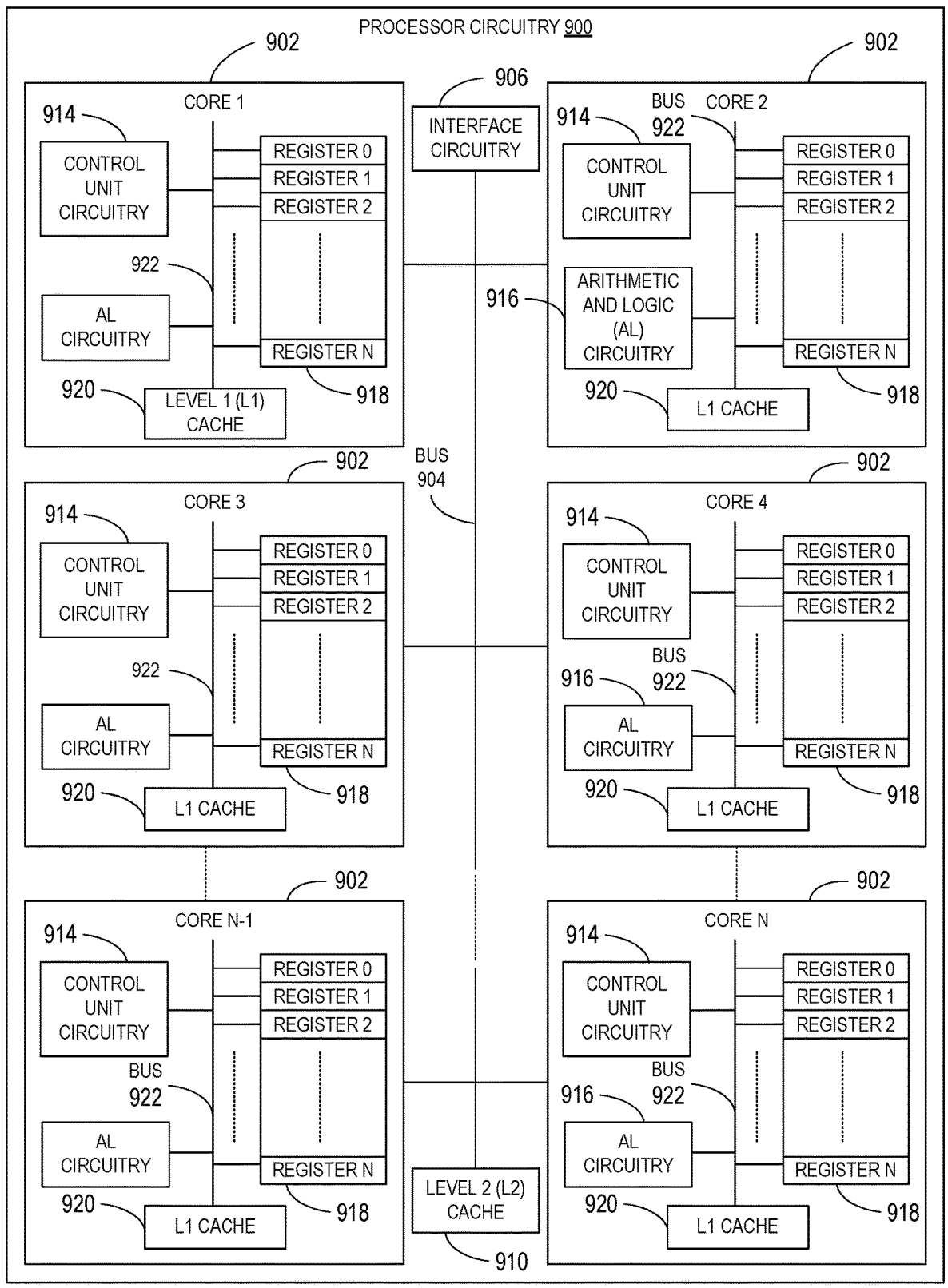
FIG. 9 is a block diagram of an example implementation of the processor circuitry of FIG. 8.

FIG. 9 is a block diagram of an example implementation of the processor circuitry 825 of FIG. 8. In this example, the processor circuitry 825 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 815, 820 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register (s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
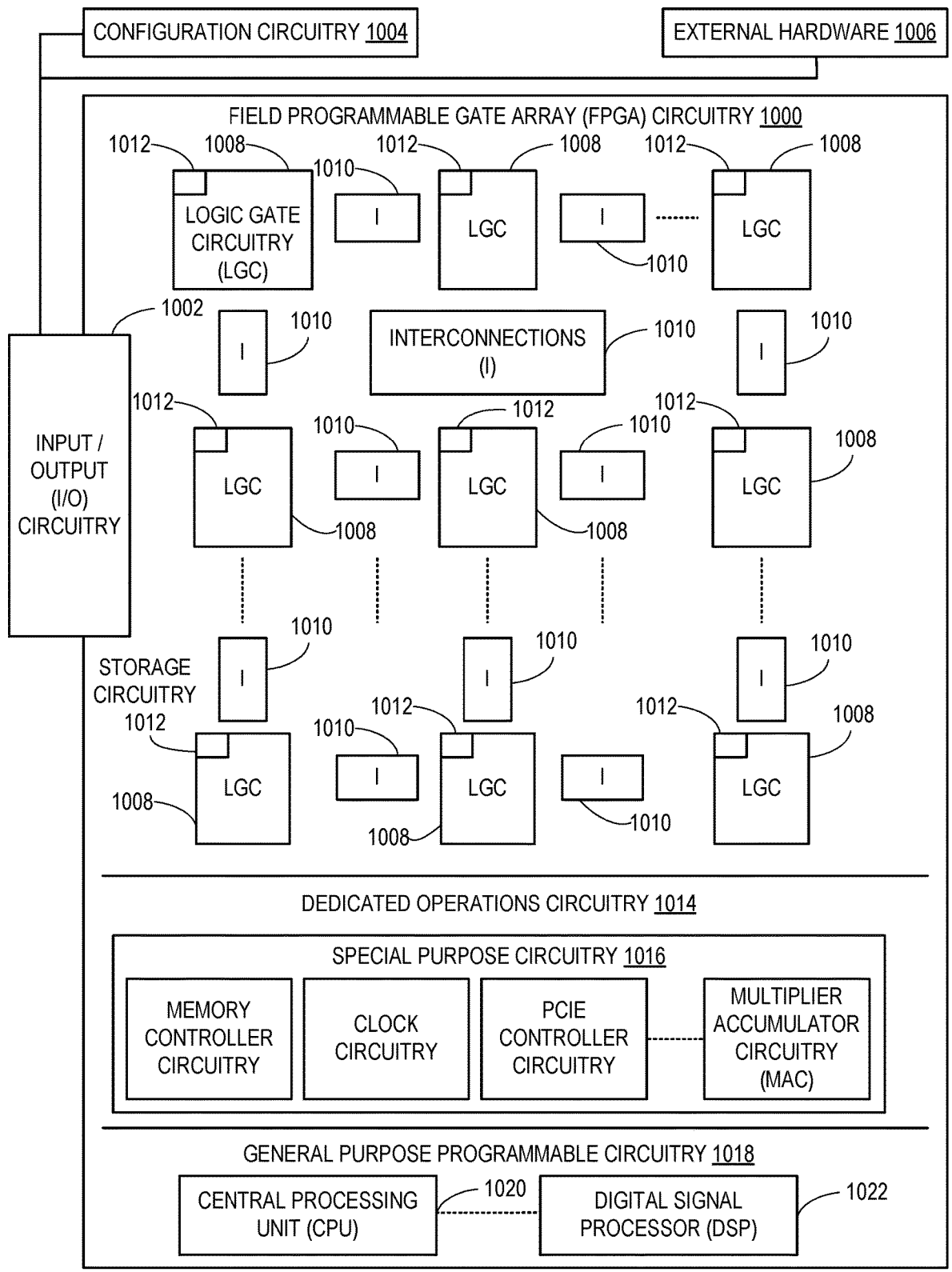
FIG. 10 is a block diagram of another example implementation of the processor circuitry of FIG. 8.

FIG. 10 is a block diagram of another example implementation of the processor circuitry 825 of FIG. 8. In this example, the processor circuitry 825 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIG. 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1000 may be structured to effectively instantiate some or all of the machine readable instructions of the flowchart of FIG. 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIG. 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 825 of FIG. 8, many other approaches are contemplated. For example, as mentioned above, modern FPGA circuitry may include an on-board CPU, such as one or more of the example CPU 1020 of FIG. 10. Therefore, the processor circuitry 825 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 7 may be executed by one or more of the cores 902 of FIG. 9 and a second portion of the machine readable instructions represented by the flowchart of FIG. 7 may be executed by the FPGA circuitry 1000 of FIG. 10.

In some examples, the processor circuitry 825 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 825 of FIG. 8, which may be in one or more packages. For example, the XPU may include a CPU in one package, a DSP in another package, a GPU in yet another package, and an FPGA in still yet another package.

Figure 11:
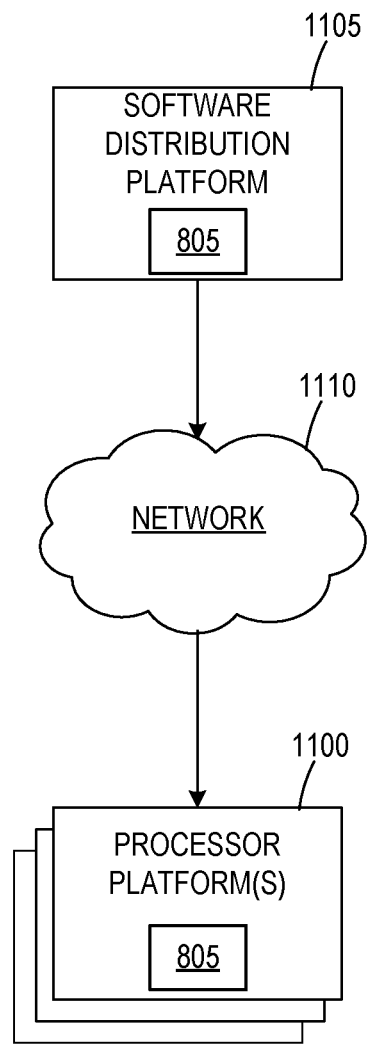
FIG. 11 is a block diagram of an example software distribution platform (e.g., one or more servers) to distribute software (e.g., software corresponding to the example machine readable instructions of FIG. 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 805 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 805 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 805, which may correspond to the example machine readable instructions 700 of FIG. 7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 805 from the software distribution platform 1105. For example, the software, which may correspond to the example machine readable instructions 7 of FIG. 7, may be downloaded to the example processor platform 800, which is to execute the machine readable instructions 805 to implement the neural network classifier circuitry 104. In some example, one or more servers of the software distribution platform 1105 periodically offer, transmit, and/or force updates to the software (e.g., the example machine readable instructions 805 of FIG. 8) to ensure improvements, patches, updates, etc., are distributed and applied to the software at the end user devices.

Example methods, apparatus, systems, and articles of manufacture to implement parallel architectures for neural network classifiers are disclosed herein. Further examples and combinations thereof include the following:

Example 1 includes a non-transitory computer readable medium comprising instructions that, when executed, cause a machine to at least process a first stream using first neural network blocks, the first stream based on an input image, process a second stream using second neural network blocks, the second stream based on the input image, fuse a result of the first neural network blocks and the second neural network blocks, perform average pooling on the result of the fuse, process a fully connected layer based on the result of the average pooling, and classify the image based on an output of the fully connected layer.

Example 2 includes the non-transitory computer readable medium of example 1, wherein the instructions, when executed, cause the machine to process a third stream using third neural network blocks, the third stream based on the input image.

Example 3 includes the non-transitory computer readable medium of example 2, wherein the instructions, when executed, cause the machine to fuse a result of the third neural network blocks with the fused result of the first neural network blocks and the second neural network blocks.

Example 4 includes the non-transitory computer readable medium of example 1, wherein the first neural network blocks include a 3×3 convolution, a skip-squeeze-excitation, and a sigmoid linear unit.

Example 5 includes the non-transitory computer readable medium of example 1, wherein the first stream is processed on a first processing unit and the second stream is processed on a second processing unit.

Example 6 includes the non-transitory computer readable medium of example 5, wherein the first processing unit is a first graphics processing unit and the second processing unit is a second graphics processing unit.

Example 7 includes an apparatus comprising interface circuitry to access an input image, and processor circuitry coupled to the interface circuitry, the processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the one or more first operations, the one or more second operations or the one or more third operations to instantiate neural network block circuitry to process a first stream using first neural network blocks, the first stream based on an input image, and process a second stream using second neural network blocks, the second stream based on the input image, fuser circuitry to fuse a result of the first neural network blocks and the second neural network blocks, averaging circuitry to perform average pooling on the result of the fuse, and fully connected layer circuitry to process a fully connected layer based on the result of the average pooling, and classify the image based on an output of the fully connected layer.

Example 8 includes the apparatus of example 7, wherein the neural network block circuitry is to process a third stream using third neural network blocks, the third stream based on the input image.

Example 9 includes the apparatus of example 8, wherein the fuser circuitry is to fuse a result of the third neural network blocks with the fused result of the first neural network blocks and the second neural network blocks.

Example 10 includes the apparatus of example 7, wherein the first neural network blocks include a 3×3 convolution, a skip-squeeze-excitation, and a sigmoid linear unit.

Example 11 includes the apparatus of example 7, wherein the first stream is processed on a first processing unit and the second stream is processed on a second processing unit.

Example 12 includes the apparatus of example 11, wherein the neural network block circuitry includes a first graphics processing unit and the second processing unit is a second graphics processing unit.

Example 13 includes a method comprising processing a first stream using first neural network blocks, the first stream based on an input image, processing a second stream using second neural network blocks, the second stream based on the input image, fusing a result of the first neural network blocks and the second neural network blocks, performing average pooling on the result of the fuse, processing a fully connected layer based on the result of the average pooling, and classifying the image based on an output of the fully connected layer.

Example 14 includes the method of example 13, further comprising processing a third stream using third neural network blocks, the third stream based on the input image.

Example 15 includes the method of example 14, further comprising fusing a result of the third neural network blocks with the fused result of the first neural network blocks and the second neural network blocks.

Example 16 includes the method of example 13, wherein the first neural network blocks include a 3×3 convolution, a skip-squeeze-excitation, and a sigmoid linear unit.

Example 17 includes the method of example 13, wherein the first stream is processed on a first processing unit and the second stream is processed on a second processing unit.

Example 18 includes the method of example 17, wherein the first processing unit is a first graphics processing unit and the second processing unit is a second graphics processing unit.

Example 19 includes an apparatus comprising means for processing a first stream using first neural network blocks, the first stream based on an input image, means for processing process a second stream using second neural network blocks, the second stream based on the input image, means for fusing a result of the first neural network blocks and the second neural network blocks, means for performing average pooling on the result of the fuse, means for processing a fully connected layer based on the result of the average pooling, and means for classifying the image based on an output of the fully connected layer.

Example 20 includes the apparatus of example 19, wherein the instructions, when executed, cause the machine to process a third stream using third neural network blocks, the third stream based on the input image.

Example 21 includes the apparatus of example 20, wherein the instructions, when executed, cause the machine to fuse a result of the third neural network blocks with the fused result of the first neural network blocks and the second neural network blocks.

Example 22 includes the apparatus of example 19, wherein the first neural network blocks include a 3×3 convolution, a skip-squeeze-excitation, and a sigmoid linear unit.

Example 23 includes the apparatus of example 19, wherein the first stream is processed on a first processing unit and the second stream is processed on a second processing unit.

Example 24 includes the apparatus of example 23, wherein the first processing unit is a first graphics processing unit and the second processing unit is a second graphics processing unit.

From the foregoing, it will be appreciated that example systems, methods, apparatus, and articles of manufacture have been disclosed that implement parallel architectures for neural network classifiers. The disclosed systems, methods, apparatus, and articles of manufacture improve the efficiency of using a computing device by enabling non-deep neural networks that may take advantage of parallel processing. The disclosed systems, methods, apparatus, and articles of manufacture are accordingly directed to one or more improvement(s) in the operation of a machine such as a computer or other electronic and/or mechanical device.

It is noted that this patent claims priority from U.S. Provisional Patent Application No. 63/194,627, which was filed on May 28, 2021, and is hereby incorporated by reference in its entirety.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium comprising instructions that, when executed, cause a machine to at least:
   process a first stream using first neural network blocks, the first stream based on an input image;
   process a second stream using second neural network blocks, the second stream based on the input image;
   fuse a result of the first neural network blocks and the second neural network blocks;
   perform average pooling on the result of the fuse;
   process a fully connected layer based on the result of the average pooling; and
   classify the image based on an output of the fully connected layer.

2. The non-transitory computer readable medium of claim 1, wherein the instructions, when executed, cause the machine to process a third stream using third neural network blocks, the third stream based on the input image.

3. The non-transitory computer readable medium of claim 2, wherein the instructions, when executed, cause the machine to fuse a result of the third neural network blocks with the fused result of the first neural network blocks and the second neural network blocks.

4. The non-transitory computer readable medium of claim 1, wherein the first neural network blocks include a 3×3 convolution, a skip-squeeze-excitation, and a sigmoid linear unit.

5. The non-transitory computer readable medium of claim 1, wherein the first stream is processed on a first processing unit and the second stream is processed on a second processing unit.

6. The non-transitory computer readable medium of claim 5, wherein the first processing unit is a first graphics processing unit and the second processing unit is a second graphics processing unit.

7. An apparatus comprising:
   interface circuitry to access an input image; and
   processor circuitry coupled to the interface circuitry, the processor circuitry including one or more of:
   at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus;
   a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the one or more first operations, the one or more second operations or the one or more third operations to instantiate:

neural network block circuitry to:
  process a first stream using first neural network blocks, the first stream based on an input image; and
  process a second stream using second neural network blocks, the second stream based on the input image;

fuser circuitry to fuse a result of the first neural network blocks and the second neural network blocks;

averaging circuitry to perform average pooling on the result of the fuse; and fully connected layer circuitry to:
  process a fully connected layer based on the result of the average pooling; and
  classify the image based on an output of the fully connected layer.

8. The apparatus of claim 7, wherein the neural network block circuitry is to process a third stream using third neural network blocks, the third stream based on the input image.

9. The apparatus of claim 8, wherein the fuser circuitry is to fuse a result of the third neural network blocks with the fused result of the first neural network blocks and the second neural network blocks.

10. The apparatus of claim 7, wherein the first neural network blocks include a 3×3 convolution, a skip-squeeze-excitation, and a sigmoid linear unit.

11. The apparatus of claim 7, wherein the first stream is processed on a first processing unit and the second stream is processed on a second processing unit.

12. The apparatus of claim 11, wherein the neural network block circuitry includes a first graphics processing unit and the second processing unit is a second graphics processing unit.

13. A method comprising:
  processing a first stream using first neural network blocks, the first stream based on an input image;
  processing a second stream using second neural network blocks, the second stream based on the input image;
  fusing a result of the first neural network blocks and the second neural network blocks;
  performing average pooling on the result of the fuse;
  processing a fully connected layer based on the result of the average pooling; and
  classifying the image based on an output of the fully connected layer.

14. The method of claim 13, further comprising processing a third stream using third neural network blocks, the third stream based on the input image.

15. The method of claim 14, further comprising fusing a result of the third neural network blocks with the fused result of the first neural network blocks and the second neural network blocks.

16. The method of claim 13, wherein the first neural network blocks include a 3×3 convolution, a skip-squeeze-excitation, and a sigmoid linear unit.

17. The method of claim 13, wherein the first stream is processed on a first processing unit and the second stream is processed on a second processing unit.

18. The method of claim 17, wherein the first processing unit is a first graphics processing unit and the second processing unit is a second graphics processing unit.

19. An apparatus comprising:
  means for processing a first stream using first neural network blocks, the first stream based on an input image;
  means for processing process a second stream using second neural network blocks, the second stream based on the input image;
  means for fusing a result of the first neural network blocks and the second neural network blocks;
  means for performing average pooling on the result of the fuse;
  means for processing a fully connected layer based on the result of the average pooling; and
  means for classifying the image based on an output of the fully connected layer.

20. The apparatus of claim 19, wherein the instructions, when executed, cause the machine to process a third stream using third neural network blocks, the third stream based on the input image.

21. The apparatus of claim 20, wherein the instructions, when executed, cause the machine to fuse a result of the third neural network blocks with the fused result of the first neural network blocks and the second neural network blocks.

22. The apparatus of claim 19, wherein the first neural network blocks include a 3×3 convolution, a skip-squeeze-excitation, and a sigmoid linear unit.

23. The apparatus of claim 19, wherein the first stream is processed on a first processing unit and the second stream is processed on a second processing unit.

24. The apparatus of claim 23, wherein the first processing unit is a first graphics processing unit and the second processing unit is a second graphics processing unit.

* * * * *